(12) United States Patent
Adams et al.

(10) Patent No.: US 10,496,388 B2
(45) Date of Patent: Dec. 3, 2019

(54) TECHNOLOGIES FOR SECURING A FIRMWARE UPDATE

(71) Applicant: Intel Corporation, Santa Clara, CA (US)

(72) Inventors: Nicholas J. Adams, Beaverton, OR (US); Krishnakumar Narasimhan, Hillsboro, OR (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/079,725

(22) Filed: Mar. 24, 2016

(65) Prior Publication Data

US 2017/0277530 A1    Sep. 28, 2017

(51) Int. Cl.
| | |
|---|---|
| *G06F 9/44* | (2018.01) |
| *G06F 8/65* | (2018.01) |
| *G06F 13/28* | (2006.01) |
| *G06F 13/42* | (2006.01) |
| *G06F 12/10* | (2016.01) |
| *G06F 12/14* | (2006.01) |
| *G06F 9/4401* | (2018.01) |
| *G06F 8/654* | (2018.01) |

(52) U.S. Cl.
CPC .............. *G06F 8/65* (2013.01); *G06F 8/654* (2018.02); *G06F 9/4403* (2013.01); *G06F 12/10* (2013.01); *G06F 12/14* (2013.01); *G06F 13/28* (2013.01); *G06F 13/4282* (2013.01); *G06F 2212/1052* (2013.01); *G06F 2212/65* (2013.01); *G06F 2213/0024* (2013.01); *G06F 2213/0042* (2013.01); *G06F 2213/28* (2013.01)

(58) Field of Classification Search
CPC . G06F 8/65; G06F 12/00; G06F 12/10; G06F 12/1081; G06F 21/572
See application file for complete search history.

(56) References Cited

U.S. PATENT DOCUMENTS

| | | | | |
|---|---|---|---|---|
| 5,838,993 | A * | 11/1998 | Riley | .................... G06F 13/126 710/22 |
| 9,264,842 | B1 * | 2/2016 | Sumner | .................... H04W 4/50 |
| 9,727,451 | B2 * | 8/2017 | Zhou | .................... G06F 9/45558 |
| 2005/0216753 | A1 * | 9/2005 | Dailey | .................. G06F 21/572 713/191 |

(Continued)

*Primary Examiner* — Duy Khuong T Nguyen
(74) *Attorney, Agent, or Firm* — Barnes & Thornburg LLP

(57) ABSTRACT

Technologies for performing a secure firmware update include a compute device that includes a memory device to store firmware update payload, one or more devices that have direct memory access (DMA) to the memory, a DMA remap module, and a firmware update module. The DMA remap module is to create a memory isolation domain for each of the one or more devices. Each memory isolation domain comprises a physical address space in the memory that is mutually exclusive to the physical address spaces of the other memory isolation domains. The firmware update module is to (i) analyze the firmware update payload to identify one or more of the devices associated with the firmware update payload and (ii) move the firmware update payload to the memory isolation domains of each associated device to enable secure transmission of the firmware update payload to the associated devices.

17 Claims, 6 Drawing Sheets

(56) References Cited

U.S. PATENT DOCUMENTS

| | | | |
|---|---|---|---|
| 2006/0288130 A1* | 12/2006 | Madukkarumukumana | ................ G06F 13/28 710/22 |
| 2014/0130034 A1* | 5/2014 | Subbu | ..................... G06F 8/654 717/172 |
| 2014/0164725 A1* | 6/2014 | Jang | ..................... G06F 21/575 711/163 |
| 2014/0365707 A1* | 12/2014 | Talagala | .............. G06F 12/0246 710/308 |
| 2015/0127871 A1* | 5/2015 | Desai | ................... G06F 21/572 710/308 |
| 2016/0019050 A1* | 1/2016 | Marr | ..................... G06F 21/572 717/172 |
| 2017/0255567 A1* | 9/2017 | Vidyadhara | ......... G06F 12/1081 |
| 2019/0095623 A1* | 3/2019 | Narasimhan | .......... G06F 21/572 |

\* cited by examiner

TECHNOLOGIES FOR SECURING A FIRMWARE UPDATE

BACKGROUND

Direct memory access (DMA) allows a DMA-capable device to access (e.g., read or write) data from the main memory of a compute device without relying on the central processing unit (CPU) to act as an intermediary between the DMA-capable device and the main memory. As a result, DMA allows data transfers, such as firmware updates, to occur at higher speeds compared to conventional memory access methods. However, modern implementations of firmware updates are vulnerable to direct memory access (DMA) attacks. For example, one DMA-capable device might write malicious data or instructions into a firmware update payload that is present in the main memory and intended for use by another DMA-capable device. As a result, when the intended DMA-capable device subsequently accesses the main memory to read the firmware update payload, it reads the corrupted version of the firmware update payload rather than the original firmware update payload.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
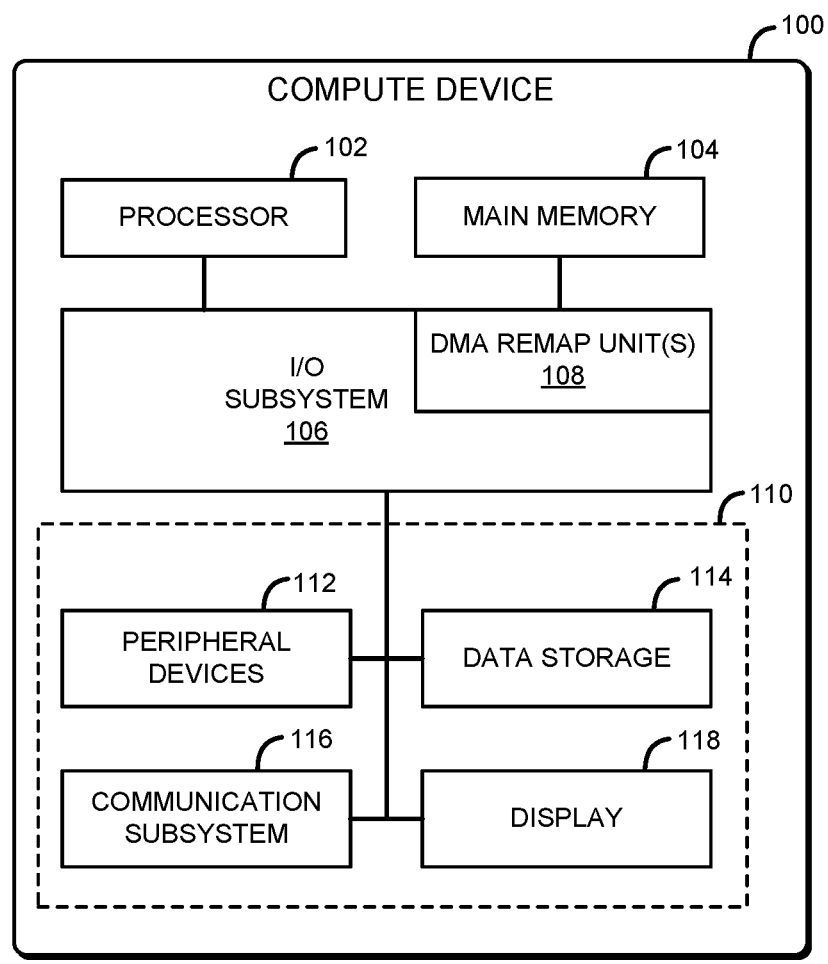
FIG. 1 is a simplified block diagram of at least one embodiment of a compute device for performing a secure firmware update.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative compute device 100 for performing a secure firmware update includes a processor 102, a memory, and an I/O subsystem 106 that includes one or more direct memory access (DMA) remap units 108. In use, as described in more detail herein, the compute device 100 is configured to use the DMA remap units 108 to generate isolation domains in the main memory 104. Each isolation domain, in the illustrative embodiment, is a memory space assigned to a particular device that is capable of accessing the memory using DMA (a "DMA-capable device"). The DMA remap units 108 translate between a memory space presented to a given DMA-capable device and the actual memory space of the main memory 104 for the isolation domain assigned to the DMA-capable device. Further, the DMA remap units 108 determine whether the particular memory access is allowed, based on a set of permissions. Accordingly, a DMA-capable device assigned to one isolation domain is unable to access (i.e., read or write) to sections of the main memory 104 that have been assigned to other DMA-capable devices that have their own isolation domains. By performing a firmware update using isolation domains, the illustrative compute device 100 may prevent one DMA-capable device from writing malicious code into the firmware update payload before it is read from the main memory 104 by the intended recipient of the firmware update (i.e., a different DMA-capable device).

The compute device 100 may be embodied as any type of compute device capable of performing the functions described herein. For example, in some embodiments, the compute device 100 may be embodied as, without limitation, a computer, a desktop computer, a workstation, a server computer, a laptop computer, a notebook computer, a tablet computer, a smartphone, a distributed computing system, a multiprocessor system, a consumer electronic device, a smart appliance, and/or any other computing device capable of performing secure firmware update as described herein. As shown in FIG. 1, the illustrative compute device 100 includes the processor 102, the memory 104, the input/output subsystem 106, the DMA remap units 108, and one or more DMA-capable devices 110. More specifically, any one or more of peripheral devices 112, a data storage device 114, a communication subsystem 116, and a display 118 may be DMA-capable devices 110, capable of accessing the main memory 104 via a bus such as a peripheral component interconnect (PCI) bus, a universal serial bus (USB), or other bus that supports access to the main memory 104 without reliance on the processor 102 to act as an intermediary. Of course, the compute device 100 may include other or additional components, such as those commonly found in a desktop computer (e.g., various input/output devices), in other embodiments. Additionally, in some embodiments, one or more of the illustrative components may be incorporated in, or otherwise from a portion of, another component. For example, the memory 104, or portions thereof, may be incorporated in the processor 102 in some embodiments.

The processor 102 may be embodied as any type of processor capable of performing the functions described herein. For example, the processor may be embodied as a single or multi-core processor(s) having one or more processor cores, a digital signal processor, a microcontroller, or other processor or processing/controlling circuit. Similarly, the memory 104 may be embodied as any type of volatile or non-volatile memory or data storage currently known or developed in the future and capable of performing the functions described herein. In operation, the memory 104 may store various data and software used during operation of the compute device 100 such as firmware update payloads, operating systems, applications, programs, libraries, and drivers. The memory 104 is communicatively coupled to the processor 102 via the I/O subsystem 106.

The I/O subsystem 106 may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the compute device 100, on a single integrated circuit chip.

In the illustrative embodiment, the I/O subsystem 106 also includes the DMA remap units 108, which are configured to generate isolation domains and translate between a memory space presented to each DMA-capable device and the main memory 104, as described above. The DMA remap units 108 may be coupled to a north bridge and a south bridge of the I/O subsystem 106 such that the DMA remap units 108 may intercept memory access requests of the DMA-capable devices 110 and translate between the memory spaces "seen" by the DMA-capable devices 110 and the physical memory space of the main memory 104 and to determine whether requested memory accesses are permitted, based on a set of permissions.

The compute device 100 additionally includes one or more peripheral devices 112. Such peripheral devices 112 may include any type of peripheral device commonly found in a compute device such as speakers, a mouse, a keyboard, and/or other input/output devices, interface devices, and/or other peripheral devices. The illustrative compute device 100 may also include a data storage device 114. The data storage device 114 may be embodied as any type of device or devices configured for short-term or long-term storage of data such as, for example, memory devices and circuits, memory cards, hard disk drives, solid-state drives, or other data storage devices. The data storage device 114 may store firmware update payloads to be read into the main memory 104, operating systems, applications, programs, libraries, and drivers, as described in more detail herein.

The illustrative compute device 100 additionally includes the communication subsystem 116. The communication subsystem 116 may be embodied as one or more devices and/or circuitry for enabling communications with one or more remote devices over a network. The communication subsystem 116 may be configured to use any suitable communication protocol to communicate with other devices including, for example, wired data communication protocols, wireless data communication protocols, and/or cellular communication protocols.

The illustrative compute device 100 may also include a display 118, which may be embodied as any type of display on which information may be displayed to a user of the compute device 100. The display 118 may be embodied as, or otherwise use, any suitable display technology including, for example, a liquid crystal display (LCD), a light emitting diode (LED) display, a cathode ray tube (CRT) display, a plasma display, and/or other display usable in a compute device. The display 118 may include a touchscreen sensor that uses any suitable touchscreen input technology to detect the user's tactile selection of information displayed on the display 118 including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors.

Figure 2:
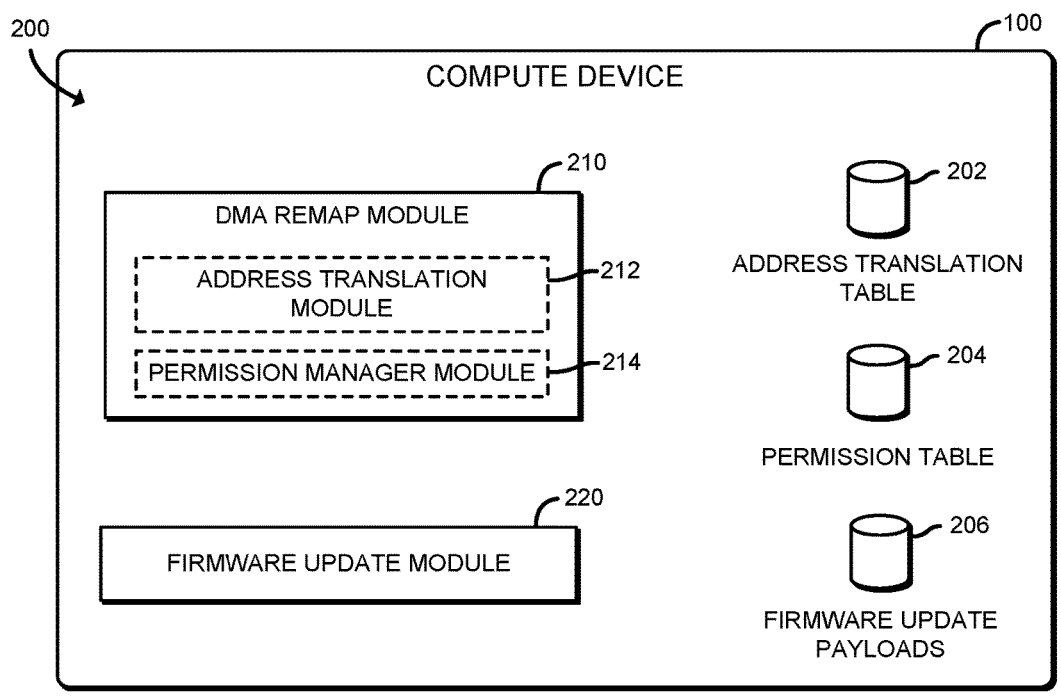
FIG. 2 is a simplified block diagram of at least one embodiment of an environment that may be established by the compute device of FIG. 1.

Referring now to FIG. 2, in the illustrative embodiment, the compute device 100 establishes an environment 200 during operation. The illustrative environment 200 includes a DMA remap module 210 and a firmware update module 220. Each of the modules, logic, and other components of the environment 200 may be embodied as hardware, firmware, software, or a combination thereof. As such, in some embodiments, one or more of the modules of the environment 200 may be embodied as circuitry or collection of electrical devices (e.g., DMA remap circuitry 210, firmware update circuitry 220, etc.). It should be appreciated that, in such embodiments, one or more of the DMA remap circuitry 210 and the firmware update circuitry 220 may form a portion of one or more of the processor 102, the I/O subsystem 106, the DMA remap units 108 and/or other components of the compute device 100. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 102 or other components of the compute device 100. In the illustrative environment 200, the compute device 100 includes an address translation table 202, a permission table 204, and firmware update payloads 206, each of which may be accessed by the various modules and/or sub-modules of the compute device 100. It should be appreciated that the compute device 100 may include other components, sub-components, modules, sub-modules, and/or devices commonly found in a compute device, which are not illustrated in FIG. 2 for clarity of the description.

The DMA remap module 210, which may be embodied as hardware, firmware, software, virtualized hardware, emulated architecture, and/or a combination thereof as discussed above, is configured to create memory isolation domains for the DMA-capable devices 110 and manage accesses to the main memory 104 through the isolation domains. To do so, in the illustrative embodiment, the DMA remap module 210 includes an address translation module 212 and a permission manager module 214. In the illustrative embodiment, the address translation module 212 is configured to establish and maintain the address translation table 202, which maps a memory address space presented to a DMA-capable device 110 to an address space within one of the isolation domains in the main memory 104. The isolation domains are mutually exclusive (i.e., non-overlapping) in the main memory 104, such that no address of one isolation domain corresponds with a physical main memory address associated with any other isolation domain. In the illustrative embodiment, the permission manager module 214 is configured to establish a set of permissions, such as the permission table 204, which defines what types of access a given DMA-capable device 110 has to each section of the isolation domain assigned to the DMA-capable device 110. The types of permissions may include read, write, and/or execute. In the illustrative embodiment, the permission manager module 214 is configured to establish the permissions during a firmware update process, described in more detail herein. Accordingly, if a DMA-capable device 110 requests to write to a memory address that the DMA-capable device does not have permission to write to, the DMA remap module 210 is configured to deny the request. It should be appreciated that each of the address translation module 212 and the permission manager module 214 of the DMA remap module 210 may be separately embodied as hardware, firmware, software, virtualized hardware, emulated architecture, and/or a combination thereof. For example, the address translation module 212 may be embodied as a hardware component, while the permission manager module 214 is embodied as a virtualized hardware component or as some other combination of hardware, firmware, software, virtualized hardware, emulated architecture, and/or a combination thereof.

The firmware update module 220, which may be embodied as hardware, firmware, software, virtualized hardware, emulated architecture, and/or a combination thereof as discussed above, is configured to analyze a firmware update payload 206 to identify one or more of the DMA-capable devices 110 associated with the firmware update payload 206. The firmware update module 220 is also configured to move the firmware update payload 206 to the memory isolation domains of each associated DMA-capable device 110 to enable secure transmission of the firmware update payload to the associated devices during a firmware update process. In the illustrative embodiment, as described in more detail herein, the firmware update module 220 is configured to boot the compute device 100 into a special firmware update boot mode after the compute device 100 has received a firmware update payload 206 (e.g., downloaded from a remote compute device, loaded from a storage device, etc.) and perform the steps of the firmware update process described above when the compute device 100 has been booted into the firmware update boot mode. Further, in the illustrative embodiment, the firmware update module 220 is configured to identify non-contiguous sections of the firmware update payload in the main memory 104 and restructure the firmware update payload 206 to be contiguous before the firmware update payload is transmitted to the intended DMA-capable devices 110. Additionally, the firmware update module 220 may be configured to monitor a progress of the firmware update process and restart the compute device 100 after the firmware update is complete.

Figure 3:
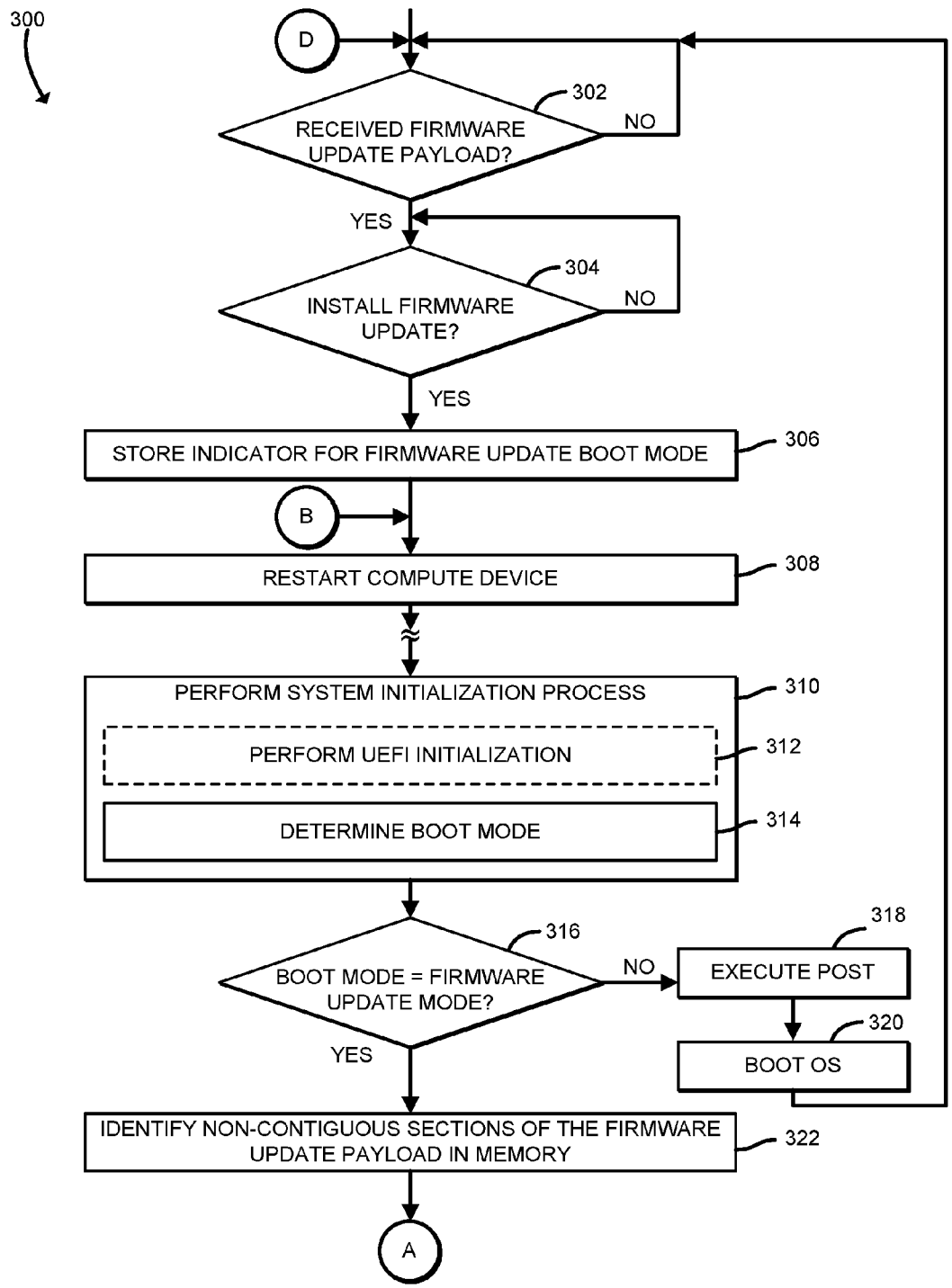
FIGS. 3-5 are a simplified flow diagram of at least one embodiment of a method for performing a secure firmware update that may be performed by the compute device of FIG. 1.

Referring now to FIG. 3, in use, the compute device 100 may execute a method 300 for performing a secure firmware update. The method 300 begins in block 302 in which the compute device 100 determines whether a firmware update payload has been received. The firmware update payload may be download by an application executing on the compute device 100 from a remote compute device (not shown) such as through the communication subsystem 116, loaded from a portable storage media (e.g., CD-ROM, DVD, portable flash drive), or obtained from another source. The compute device 100 may continually monitor for a received firmware update payload. If the compute device 100 determines in block 302 that a firmware update payload 206, has been received, the method 300 advances to block 304 in which the compute device 100 determines whether to install the firmware update. In the illustrative embodiment, the compute device 100 may display a prompt to a user, asking whether to proceed with the firmware update, and receive an affirmative response from the user. In other embodiments, the compute device 100 may identify, in the firmware update payload, an indicator of when to install the firmware update. In other embodiments, the compute device 100 may determine whether to install the firmware update by another method. Regardless, if in block 304 the compute device 100 determines to install the firmware update, the method 300 advances to block 306 in which the compute device 100 stores an indicator (e.g., in the data storage device 114) to boot into a firmware update boot mode after the compute device 100 has been restarted. Otherwise, if the compute device 100 does not determine to install the firmware update, the method 300 loops back to block 304 to continue to determine whether to install the firmware update (e.g., wait for user approval to install the firmware update, wait for the scheduled time to install the firmware update, etc.).

In block 308, the compute device 100 restarts itself. In block 310, the compute device 100 performs a system initialization process. In the illustrative embodiment, in performing the system initialization process, the compute device 100 performs a unified extensible firmware interface (UEFI) initialization, as indicated in block 312. In performing the UEFI initialization, the compute device 100 may perform a first phase known as the security phase (SEC) and a second phase, known as the pre-EFI initialization phase (PEI). Further, in the illustrative embodiment, the compute device 100 determines the boot mode, as indicate in block 314. For example, the compute device 100 may determine whether the indicator stored in block 306 is present (e.g., in the data storage device 114 or in the main memory 104). In block 316, the compute device 100 determines whether the present boot mode is the firmware update mode. In the illustrative embodiment, if the compute device 100 determines that the indicator store in block 306 is not present, or if it indicates a normal boot mode rather than the firmware update boot mode, the method 300 advances to block 318 in which the compute device 100 executes a power on self test (POST). Additionally, the compute device 100 boots the operating system, as indicated in block 320, and the method 300 loops back to block 302, in which the compute device 100 again determines whether a firmware update payload 206 has been received. Otherwise, if the compute device 100 determines, in block 316 that the boot mode is the firmware update mode, the method 300 advances to block 322 in which the compute device 100 identifies non-contiguous sections of the firmware update payload in the main memory 104.

Figure 4:
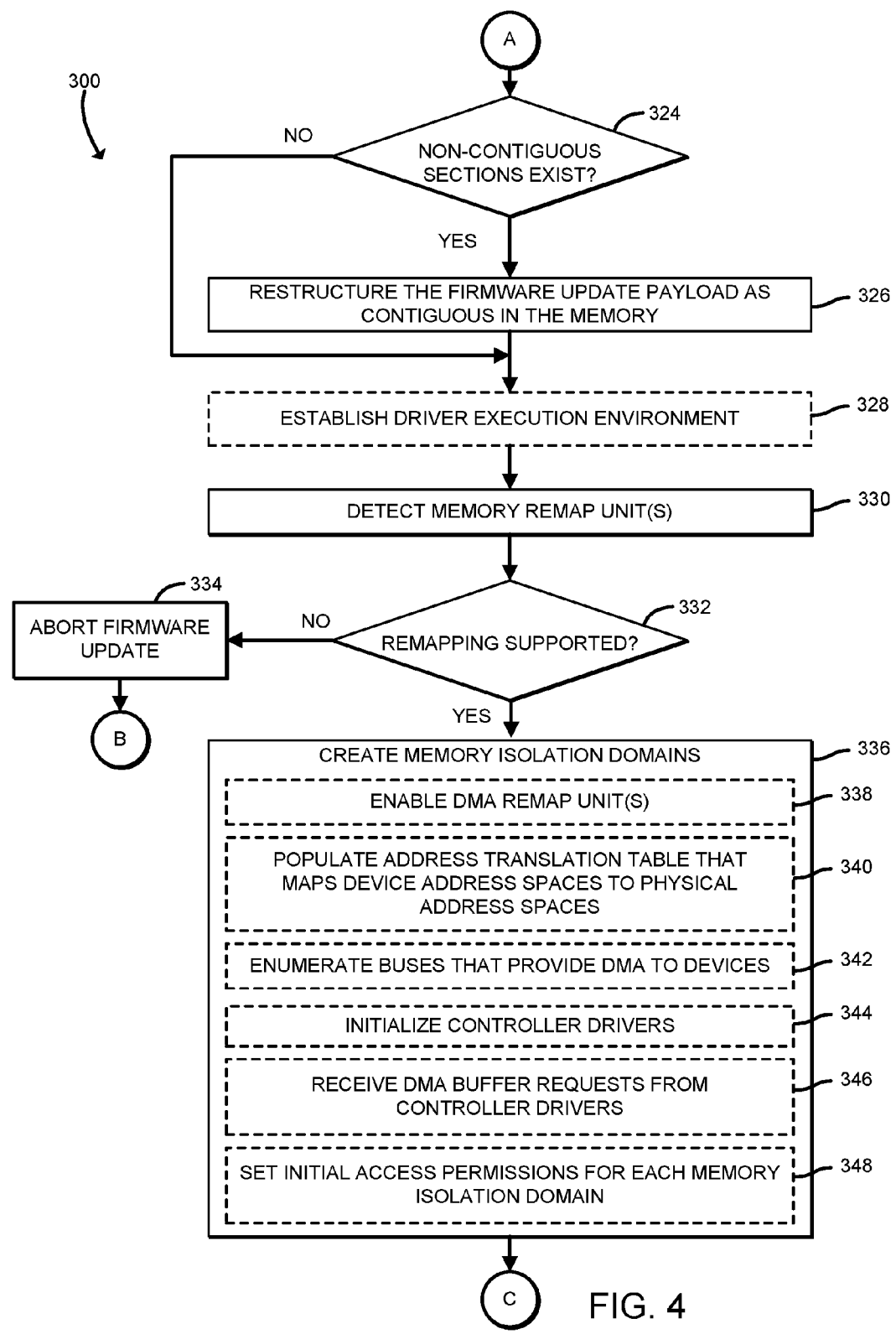

In block 324 of FIG. 4, the compute device 100 determines whether any non-contiguous sections of the firmware update payload 206 were identified in block 322. If so, the method 300 advances to block 326 in which the compute device 100 restructures the firmware update payload 206 as contiguous in the main memory 104. For example, the compute device 100 may restructure the firmware update payload 206 by relocating the non-contiguous sections to a contiguous region in the main memory 104. In the illustrative embodiment, in block 328, the compute device 100 establishes a driver execution environment (DXE), which is a third phase of a UEFI boot sequence, in which the compute device 100 loads drivers for devices. In other embodiments, the compute device 100 may not use a UEFI and instead performs a non-UEFI system initialization process. In block 330, the compute device 100 detects the DMA remap units 108. In the illustrative embodiment, the processor 102 may transmit a test message intended for the DMA remap units 108 and, if the processor 102 receives an expected response from the test message, then the compute device 100 determines that the DMA remap units 108 are present. In other embodiments, the compute device 100 may detect the presence of the DMA remap units 108 using another method, such as by identifying a model number of the compute device 100 and comparing the identified model number to a predefined list of models numbers of compute devices that include DMA remap units. Regardless, in block 332, the compute device 100 determines whether remapping is supported (i.e., whether the DMA remap units 108 were detected in block 330). If the compute device 100 determines that remapping is not supported, the method 300 advances to block 334 to abort the firmware update and restart the compute device 100, in block 308 of FIG. 3. Otherwise, if the compute device 100 determines in block 332 that remapping is supported, the method 300 advances to block 336 to create isolation domains. In some embodiments, the compute device 100 may proceed to creating the isolation domains even if remapping is not supported.

In creating the isolation domains, the compute device 100 may perform a variety of operations, as described herein. As indicated in block 338, in the illustrative embodiment, the compute device 100 enables the DMA remap units 108, such as by transmitting an activation message to the DMA remap units 108. In block 340, the illustrative compute device 100 populates the address translation table 202 such that the address translation table 202 maps device address spaces (i.e., address spaces presented to each DMA-capable device 110) to physical address spaces of the main memory 104. In the illustrative embodiment, the physical address spaces for a given isolation domain in the main memory 104 have a one to one mapping to the device address spaces presented to each DMA-capable device 110. In block 342, the illustrative compute device 100 enumerates the buses that provide DMA to devices (i.e., to the DMA-capable devices 110). The buses may include USB buses, PCI buses, and/or other buses. In the illustrative embodiment, enumerating a bus means identifying the devices coupled to the bus. In the illustrative embodiment, the compute device 100 additionally allocates a range of physical addresses in the main memory 104 for each enumerated bus.

As indicated in block 344, the illustrative compute device 100 initializes the controller drivers for each bus. For example, the illustrative compute device 100 initializes a driver for a USB controller, initializes a driver for a PCI controller, and initializes drivers for controllers of any other buses that provide direct memory access for devices (e.g., DMA-capable devices 110) coupled thereto. In block 346, the illustrative compute device 100 receives DMA buffer requests from the controller drivers that were initialized in block 344. In other words, the illustrative compute device 100 may receive, in block 346, a request from a USB controller for a memory buffer to use to directly access the main memory 104. Similarly, the illustrative compute device 100 may additionally or alternatively receive a request from a PCI controller for a memory buffer for use in directly accessing the main memory 104. In block 348, the illustrative compute device 100 sets initial access permissions for each memory isolation domain. In the illustrative embodiment, the compute device 100 designates, in block 348, which memory addresses may be read from and which memory addresses may be written to for each isolation domain.

Figure 5:
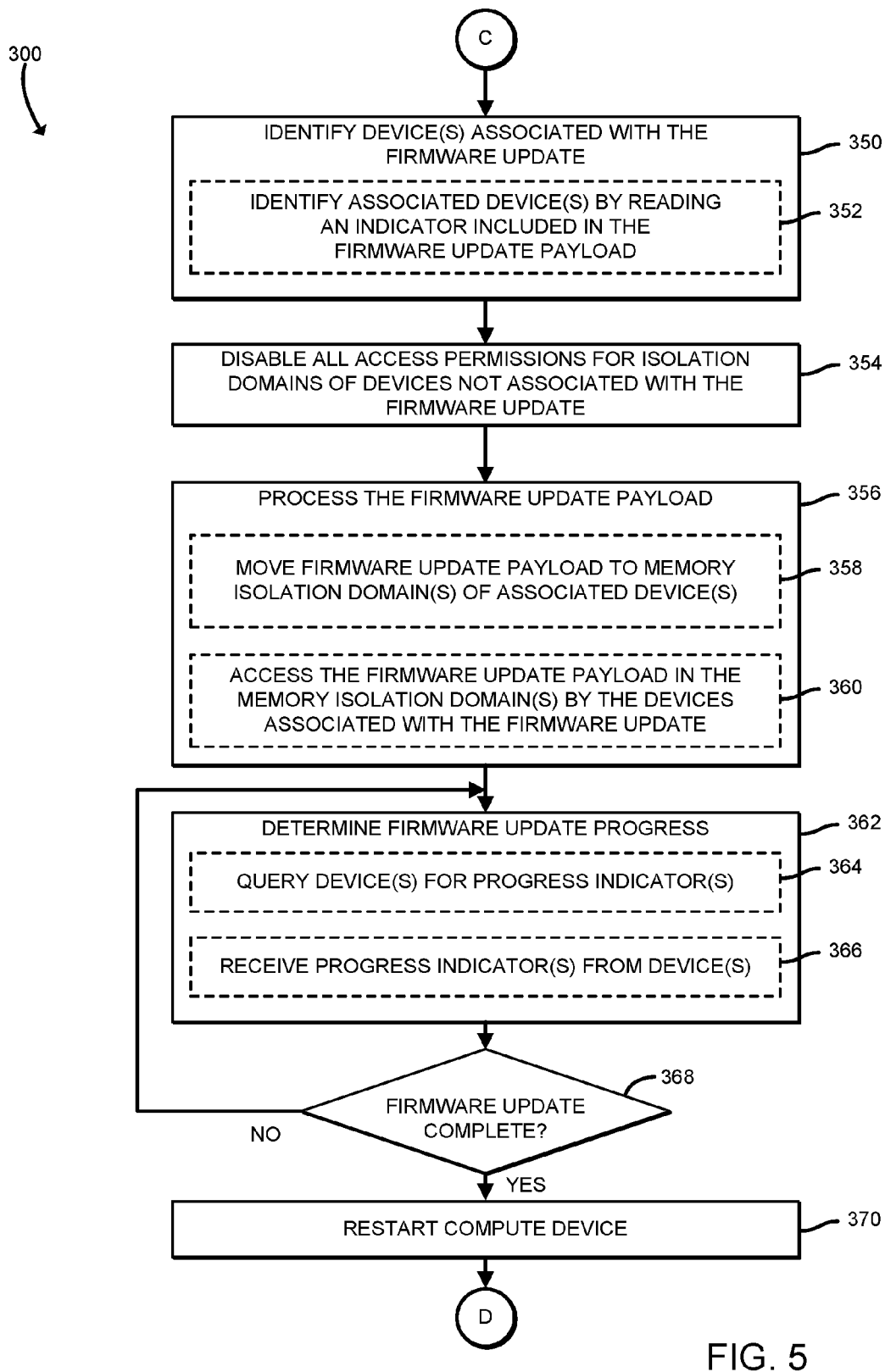

In block 350 of FIG. 5, the compute device 100 identifies devices (i.e., DMA-capable devices 110) associated with the firmware update. In the illustrative embodiment, as indicated in block 352, the compute device 100 identifies devices associated with the firmware update by reading an indicator included in the firmware update payload 206. The indicator may be one or more identifiers located in the firmware update payload 206, such as in a header of the firmware update payload 206, in a specific file in the firmware update payload 206, or in another form included with the firmware update payload 206. The indicators may match one or more of the devices identified in block 342. In other words, indicators may be embodied as device identifiers that are equal to one or more identifiers of the devices identified in block 342. In block 354, the compute device 100 disables all access permissions for isolation domains associated with devices (e.g., the DMA-capable devices 110) that are not associated with the firmware update (i.e., DMA-capable devices 110 that are not identified in the firmware update payload 206).

In block 356, the compute device 100 processes the firmware update payload 206. In particular, in the illustrative embodiment, the compute device 100 moves the firmware update payload 206 to the memory isolation domains for the devices (i.e., the DMA-capable devices 110) associated with the firmware update, as indicated in block 358. In block 360, the illustrative compute device 100 accesses the firmware update payload 206 in the main memory 104 by the devices (i.e., the DMA-capable devices 110) associated with the firmware update. As an example, if the firmware update payload 206 is intended for one of the peripheral devices 112, the peripheral device 112 may read the firmware update payload from an isolation domain that was created in the main memory 104 for that peripheral device 112. The peripheral device 112 may request to read the firmware update starting at one memory address (e.g., 0x00000000), in the device address space, and the DMA remap unit 108 may translate the memory address to a physical address of the main memory 104 (e.g., 0x00FF0000) that falls within the isolation domain associated with the peripheral device 112. The DMA remap unit 108 may additionally verify that the peripheral device 112 has read access permissions for that physical address (e.g., 0x00FF0000) within the isolation domain before transmitting the data to the peripheral device 112.

In block 362, the compute device 100 determines the firmware update progress. In the illustrative embodiment, as indicated in block 364, the compute device 100 queries each device (e.g., each associated DMA-capable device 110) associated with the firmware update for a progress indicator, such as an amount of the total firmware update payload 206 that has been read by each device, a percentage of completion, an estimated amount of time remaining to complete the firmware update, or other representation of the amount of progress each device has made in the firmware update. In block 366, the illustrative compute device 100 receives the progress indicator from each device performing the firmware update. In block 368, the compute device 100 determines whether the firmware update is complete. In the illustrative embodiment, the compute device 100 analyzes each progress indicator received from each device associated with the firmware update and determines whether all of the devices associated with the firmware update have completed the firmware update. If the firmware update is not yet complete, the method 300 loops back to block 362 in which the compute device 100 again determines the firmware update progress. Otherwise, the method 300 advances to block 370 in which the compute device 100 restarts itself. Subsequently, the method 300 loops back to block 302 to determine whether another firmware update payload has been received.

Figure 6:
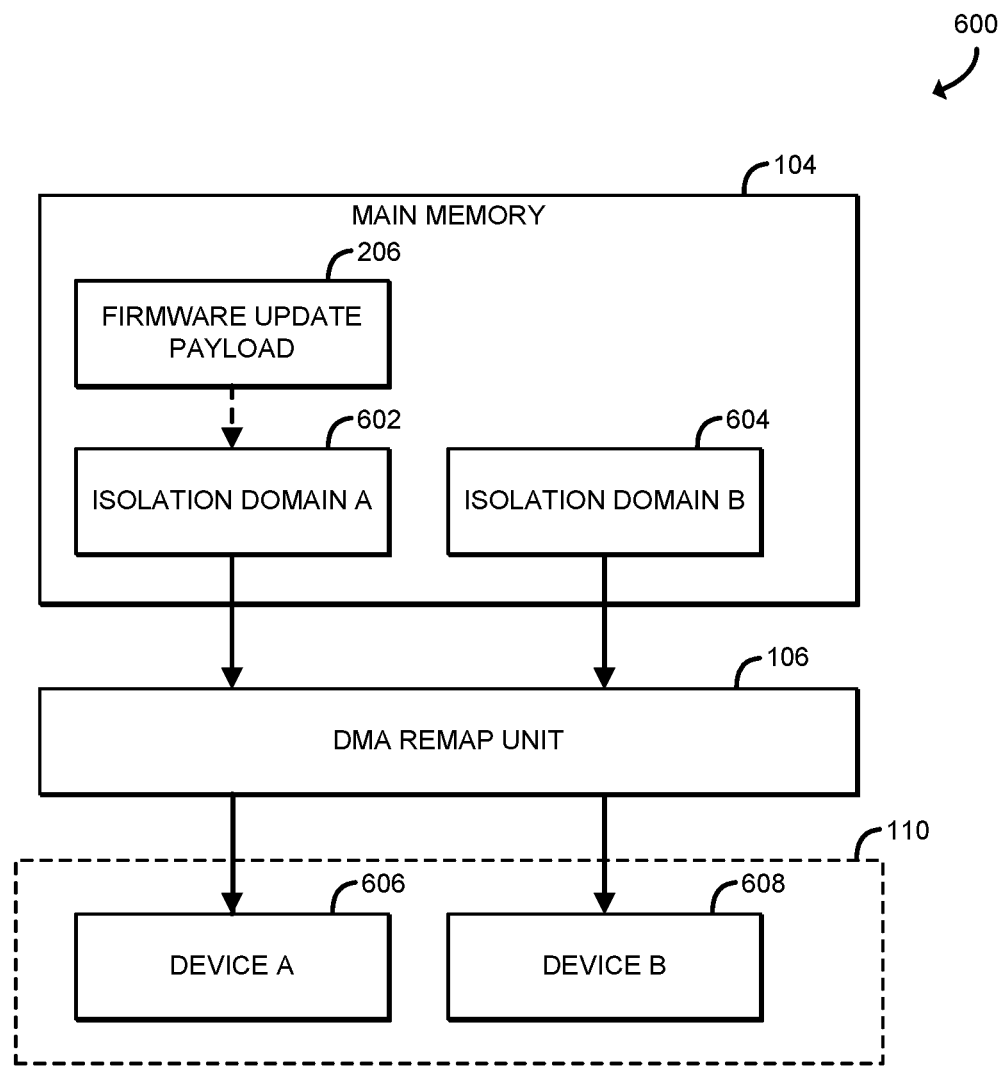
FIG. 6 is a simplified block diagram of at least one embodiment of isolation domains created by a DMA remap unit of the compute device of FIG. 1 to perform the secure firmware update.

Referring now to FIG. 6, in use, the compute device 100 may generate isolation domains 602, 604 for respective DMA-capable devices 606, 608 in the main memory 104. As shown in the diagram 600, in use, the DMA remap unit 108 assigns the isolation domain 602 to the DMA-capable device 606 and translates between a device memory address space used by the DMA-capable device 606 and a physical address space of the main memory 104 for the isolation domain 602. Similarly, the DMA remap unit 108 assigns the isolation domain 604 to the DMA-capable device 608 and translates between a device memory address space used by the DMA-capable device 608 and a physical address space of the main memory 104 for the isolation domain 604. The isolation domains 602, 604 are mutually exclusive, such that no physical memory address within the isolation domain 602 is also within the isolation domain 604. In the illustrative embodiment, in use, after determining that the firmware update payload 206 is associated with the DMA-capable device 606 and not the DMA-capable device 608, the compute device 100 moves the firmware update payload 206 into the isolation domain 602. Accordingly, while the firmware update payload is accessible to the DMA-capable device 606, it is not accessible to the DMA-capable device 608. As a result, the DMA-capable device 608 is unable to write malicious data to the firmware update payload 206.

EXAMPLES

Illustrative examples of the devices, systems, and methods disclosed herein are provided below. An embodiment of the devices, systems, and methods may include any one or more, and any combination of, the examples described below.

Example 1 includes a compute device for performing a secure firmware update, the compute device comprising a memory to store a firmware update payload; one or more devices that have direct memory access (DMA) to the memory; a DMA remap module to create a memory isolation domain for each of the one or more devices, wherein each memory isolation domain comprises a physical address space in the memory that is mutually exclusive to the physical address spaces of the other memory isolation domains; and a firmware update module to (i) analyze the firmware update payload to identify one or more of the devices associated with the firmware update payload and (ii) move the firmware update payload to the memory isolation domains of each associated device to enable secure transmission of the firmware update payload to the associated devices.

Example 2 includes the subject matter of Example 1, and wherein the DMA remap module is further to disable access to the isolation domains of the devices that are not associated with the firmware update payload after the devices not associated with the firmware update payload have been identified.

Example 3 includes the subject matter of any of Examples 1 and 2, and wherein to analyze the firmware update payload comprises to analyze an identifier included in the firmware update payload, wherein the identifier identifies the devices associated with the firmware update payload.

Example 4 includes the subject matter of any of Examples 1-3, and wherein the DMA remap module is further to detect a memory access request transmitted from one of the devices, wherein the memory access request includes a first address within a device address space; and translate, in response to the detection of the memory access request, the first address to a second address within the physical address space of the isolation domain associated with the device that transmitted the memory access request.

Example 5 includes the subject matter of any of Examples 1-4, and wherein to create an isolation domain comprises to initialize a controller driver associated with one of the devices; receive a DMA buffer request from the controller driver, wherein the DMA buffer request includes an identification of at least one of an address range for memory reads or an address range for memory writes; and set at least one of a read permission or a write permission associated with one or more corresponding physical address ranges in the physical address space, based on the DMA buffer request.

Example 6 includes the subject matter of any of Examples 1-5, and wherein the firmware update module is further to detect a request to install the firmware update payload; boot, in response to the detection of the request to install the firmware update payload, the compute device in a firmware update boot mode; determine whether the compute device is able to remap memory addresses from a device address space to a physical address space of the memory; and transmit, in response to a determination that the compute device is able to remap the memory addresses, a request to the DMA remap module to create the memory isolation domain for each device.

Example 7 includes the subject matter of any of Examples 1-6, and wherein to create the memory isolation domains comprises to enumerate one or more buses that provide DMA access to the memory; and allocate a range of physical addresses in the memory for each enumerated bus.

Example 8 includes the subject matter of any of Examples 1-7, and wherein to enumerate one or more buses that provide DMA access to the memory comprises to enumerate at least one of a peripheral component interconnect (PCI) bus or a universal serial bus (USB).

Example 9 includes the subject matter of any of Examples 1-8, and wherein to create the memory isolation domains comprises to populate an address translation table that maps device address spaces to the corresponding physical address spaces in the memory.

Example 10 includes the subject matter of any of Examples 1-9, and wherein the firmware update module is further to query each associated device to determine whether the firmware update is complete; and restart the compute device in response to a determination that the firmware update is complete.

Example 11 includes the subject matter of any of Examples 1-10, and wherein the firmware update module is further to boot the compute device in a firmware update mode and initialize a driver execution environment of a unified extensible firmware interface before the devices associated with the firmware update payload are identified.

Example 12 includes the subject matter of any of Examples 1-11, and wherein the firmware update module is further to identify a plurality of non-contiguous sections of the firmware update payload in the memory; and relocate the non-contiguous sections to a contiguous region in the memory before the firmware update payload is transmitted to the associated devices.

Example 13 includes the subject matter of any of Examples 1-12, and wherein the firmware update module is further to detect whether the compute device includes at least one memory remap unit; and abort the firmware update in response to a determination that the compute device does not include at least one memory remap unit.

Example 14 includes the subject matter of any of Examples 1-13, and wherein to move the firmware update payload to the memory isolation domains comprise to move the firmware update payload to the memory isolation domains after the compute device has booted into a firmware update mode.

Example 15 includes the subject matter of any of Examples 1-14, and wherein to create a memory isolation domain for each of the one or more devices comprises to create a memory isolation domain for a peripheral device.

Example 16 includes a method for performing a secure firmware update, the method comprising creating, by a compute device, a memory isolation domain for each of one or more devices that have direct memory access to a memory of the compute device, wherein each memory isolation domain comprises a physical address space in the memory that is mutually exclusive to the physical address spaces of the other memory isolation domains; analyzing, by the compute device, a firmware update payload stored in the memory to identify one or more of the devices associated with the firmware update payload; and moving, by the compute device, the firmware update payload to the memory isolation domains of each associated device to enable secure transmission of the firmware update payload to the associated devices.

Example 17 includes the subject matter of Example 16, and further including disabling, by the compute device, access to the isolation domains of the devices that are not associated with the firmware update payload after the devices not associated with the firmware update payload have been identified.

Example 18 includes the subject matter of any of Examples 16 and 17, and wherein analyzing the firmware update payload comprises analyzing an identifier included in the firmware update payload, wherein the identifier identifies the devices associated with the firmware update payload.

Example 19 includes the subject matter of any of Examples 16-18, and further including detecting, by the compute device, a memory access request transmitted from one of the devices, wherein the memory access request includes a first address within a device address space; and translating, by the compute device and in response to the detection of the memory access request, the first address to a second address within the physical address space of the isolation domain associated with the device that transmitted the memory access request.

Example 20 includes the subject matter of any of Examples 16-19, and wherein creating an isolation domain comprises initializing, by the compute device, a controller driver associated with one of the devices; receiving, by the compute device, a DMA buffer request from the controller driver, wherein the DMA buffer request includes an identification of at least one of an address range for memory reads or an address range for memory writes; and setting, by the compute device, at least one of a read permission or a write permission associated with one or more corresponding physical address ranges in the physical address space, based on the DMA buffer request.

Example 21 includes the subject matter of any of Examples 16-20, and further including detecting, by the compute device, a request to install the firmware update payload; booting, by the compute device, in response to the detection of the request to install the firmware update payload, the compute device in a firmware update boot mode; determining, by the compute device, whether the compute device is able to remap memory addresses from a device address space to a physical address space of the memory; and creating, by the compute device and in response to a determination that the compute device is able to remap the memory addresses, the memory isolation domain for each device.

Example 22 includes the subject matter of any of Examples 16-21, and wherein creating the memory isolation domains further comprises enumerating, by the compute device, one or more buses that provide DMA access to the memory; and allocating, by the compute device, a range of physical addresses in the memory for each enumerated bus.

Example 23 includes the subject matter of any of Examples 16-22, and wherein enumerating one or more buses that provide DMA access to the memory comprises enumerating at least one of a peripheral component interconnect (PCI) bus or a universal serial bus (USB).

Example 24 includes the subject matter of any of Examples 16-23, and wherein creating the memory isolation domains comprises populating, by the compute device, an address translation table that maps device address spaces to the corresponding physical address spaces in the memory.

Example 25 includes the subject matter of any of Examples 16-24, and further including querying, by the compute device, each associated device to determine whether the firmware update is complete; and restarting the compute device in response to a determination that the firmware update is complete.

Example 26 includes the subject matter of any of Examples 16-25, and further including booting the compute device in a firmware update mode; and initializing, by the compute device, a driver execution environment of a unified extensible firmware interface before the devices associated with the firmware update payload are identified.

Example 27 includes the subject matter of any of Examples 16-26, and further including identifying, by the compute device, a plurality of non-contiguous sections of the firmware update payload in the memory; and relocating, by the compute device, the non-contiguous sections to a contiguous region in the memory before the firmware update payload is transmitted to the associated devices.

Example 28 includes the subject matter of any of Examples 16-27, and further including detecting, by the compute device, whether the compute device includes at least one memory remap unit; and aborting, by the compute device, the firmware update in response to a determination that the compute device does not include at least one memory remap unit.

Example 29 includes the subject matter of any of Examples 16-28, and wherein moving the firmware update payload to the memory isolation domains comprises moving the firmware update payload to the memory isolation domains after the compute device has booted into a firmware update mode.

Example 30 includes the subject matter of any of Examples 16-29, and wherein creating a memory isolation domain for each of the one or more devices comprises creating a memory isolation domain for a peripheral device.

Example 31 includes one or more computer-readable storage media comprising a plurality of instructions that, when executed, cause a compute device to perform the method of any of Examples 16-30.

Example 32 includes a compute device for performing a secure firmware update, the compute device comprising means for creating a memory isolation domain for each of one or more devices that have direct memory access to a memory of the compute device, wherein each memory isolation domain comprises a physical address space in the memory that is mutually exclusive to the physical address spaces of the other memory isolation domains; means for analyzing a firmware update payload stored in the memory to identify one or more of the devices associated with the firmware update payload; and means for moving the firmware update payload to the memory isolation domains of each associated device to enable secure transmission of the firmware update payload to the associated devices.

Example 33 includes the subject matter of Example 32, and further including means for disabling access to the isolation domains of the devices that are not associated with the firmware update payload after the devices not associated with the firmware update payload have been identified.

Example 34 includes the subject matter of any of Examples 32 and 33, and wherein the means for analyzing the firmware update payload comprises means for analyzing an identifier included in the firmware update payload, wherein the identifier identifies the devices associated with the firmware update payload.

Example 35 includes the subject matter of any of Examples 32-34, and further including means for detecting a memory access request transmitted from one of the devices, wherein the memory access request includes a first address within a device address space; and means for translating, in response to the detection of the memory access request, the first address to a second address within the physical address space of the isolation domain associated with the device that transmitted the memory access request.

Example 36 includes the subject matter of any of Examples 32-35, and wherein the means for creating an isolation domain comprises means for initializing a controller driver associated with one of the devices; means for receiving a DMA buffer request from the controller driver, wherein the DMA buffer request includes an identification of at least one of an address range for memory reads or an address range for memory writes; and means for setting at least one of a read permission or a write permission associated with one or more corresponding physical address ranges in the physical address space, based on the DMA buffer request.

Example 37 includes the subject matter of any of Examples 32-36, and further including means for detecting a request to install the firmware update payload; means for booting in response to the detection of the request to install the firmware update payload, the compute device in a firmware update boot mode; means for determining whether the compute device is able to remap memory addresses from a device address space to a physical address space of the memory; and means for creating, in response to a determination that the compute device is able to remap the memory addresses, the memory isolation domain for each device.

Example 38 includes the subject matter of any of Examples 32-37, and wherein the means for creating the memory isolation domains further comprises means for enumerating one or more buses that provide DMA access to the memory; and means for allocating a range of physical addresses in the memory for each enumerated bus.

Example 39 includes the subject matter of any of Examples 32-38, and wherein the means for enumerating one or more buses that provide DMA access to the memory comprises means for enumerating at least one of a peripheral component interconnect (PCI) bus or a universal serial bus (USB).

Example 40 includes the subject matter of any of Examples 32-39, and wherein the means for creating the memory isolation domains comprises means for populating an address translation table that maps device address spaces to the corresponding physical address spaces in the memory.

Example 41 includes the subject matter of any of Examples 32-40, and further including means for querying each associated device to determine whether the firmware update is complete; and means for restarting the compute device in response to a determination that the firmware update is complete.

Example 42 includes the subject matter of any of Examples 32-41, and further including means for booting the compute device in a firmware update mode; and means for initializing a driver execution environment of a unified extensible firmware interface before the devices associated with the firmware update payload are identified.

Example 43 includes the subject matter of any of Examples 32-42, and further including means for identifying a plurality of non-contiguous sections of the firmware update payload in the memory; and means for relocating the non-contiguous sections to a contiguous region in the memory before the firmware update payload is transmitted to the associated devices.

Example 44 includes the subject matter of any of Examples 32-43, and further including means for detecting whether the compute device includes at least one memory remap unit; and means for aborting the firmware update in response to a determination that the compute device does not include at least one memory remap unit.

Example 45 includes the subject matter of any of Examples 32-44, and wherein the means for moving the firmware update payload to the memory isolation domains comprises means for moving the firmware update payload to the memory isolation domains after the compute device has booted into a firmware update mode.

Example 46 includes the subject matter of any of Examples 32-45, and wherein the means for creating a memory isolation domain for each of the one or more devices comprises means for creating a memory isolation domain for a peripheral device.

The invention claimed is:

1. A compute device for performing a secure firmware update, the compute device comprising:
   a memory to store a firmware update payload;
   one or more physical devices that have direct memory access (DMA) to the memory; and
   circuitry to:

boot, in response to detection of a request to install the firmware update payload, the compute device in a firmware update boot mode;
determine whether the compute device is able to remap memory addresses from a device address space to a physical address space of the memory;
transmit, in response to a determination that the compute device is able to remap the memory addresses, a request to create a memory isolation domain for each physical device;
create the memory isolation domain for each of the one or more physical devices, wherein each memory isolation domain comprises a device address space that is indirectly mapped to a physical address space in the memory that is mutually exclusive to the physical address spaces of the other memory isolation domains;
analyze an identifier included in the firmware update payload that identifies one or more of the physical devices associated with the firmware update payload;
disable access to the isolation domains of the physical devices that are not associated with the firmware update payload after the physical devices not associated with the firmware update payload have been identified;
move the firmware update payload to the memory isolation domains of each associated physical device to enable secure transmission of the firmware update payload to the associated physical devices.

2. The compute device of claim 1, wherein the circuitry is further to:
detect a memory access request transmitted from one of the physical devices, wherein the memory access request includes a first address within the device address space; and
translate, in response to the detection of the memory access request, the first address to a second address within the physical address space of the isolation domain associated with the physical device that transmitted the memory access request.

3. The compute device of claim 1, wherein to create an isolation domain comprises to:
initialize a controller driver associated with one of the physical devices;
receive a DMA buffer request from the controller driver, wherein the DMA buffer request includes an identification of at least one of an address range for memory reads or an address range for memory writes; and
set at least one of a read permission or a write permission associated with one or more corresponding physical address ranges in the physical address space, based on the DMA buffer request.

4. The compute device of claim 1, wherein to create the memory isolation domains comprises to:
enumerate one or more buses that provide DMA access to the memory; and
allocate a range of physical addresses in the memory for each enumerated bus.

5. The compute device of claim 4, wherein to enumerate one or more buses that provide DMA access to the memory comprises to enumerate at least one of a peripheral component interconnect (PCI) bus or a universal serial bus (USB).

6. The compute device of claim 1, wherein to create the memory isolation domains comprises to populate an address translation table that maps device address spaces to the corresponding physical address spaces in the memory.

7. The compute device of claim 1, wherein to analyze the identifier included in the firmware update comprises to read a header of the update payload, wherein the header includes the identifier.

8. One or more non-transitory computer-readable storage media comprising a plurality of instructions that, when executed, cause a compute device to:
boot, in response to detection of a request to install a firmware update payload, the compute device in a firmware update boot mode;
determine whether the compute device is able to remap memory addresses from a device address space to a physical address space of a memory of the compute device;
transmit, in response to a determination that the compute device is able to remap the memory addresses, a request to create a memory isolation domain for each of one or more physical devices that have direct memory access to the memory of the compute device;
create the memory isolation domain for each of the one or more physical devices, wherein each memory isolation domain comprises a device address space that is indirectly mapped to a physical address space in the memory that is mutually exclusive to the physical address spaces of the other memory isolation domains;
analyze an identifier included in a firmware update payload stored in the memory that identifies one or more of the physical devices associated with the firmware update payload;
disable access to the isolation domains of the physical devices that are not associated with the firmware update payload after the physical devices not associated with the firmware update payload have been identified; and
move the firmware update payload to the memory isolation domains of each associated physical device to enable secure transmission of the firmware update payload to the associated physical devices.

9. The one or more non-transitory computer-readable storage media of claim 8, further comprising instructions that, when executed, cause the compute device to:
detect a memory access request transmitted from one of the physical devices, wherein the memory access request includes a first address within the device address space; and
translate, in response to the detection of the memory access request, the first address to a second address within the physical address space of the isolation domain associated with the physical device that transmitted the memory access request.

10. The one or more non-transitory computer-readable storage media of claim 8, wherein to create an isolation domain comprises to:
initialize a controller driver associated with one of the physical devices;
receive a DMA buffer request from the controller driver, wherein the DMA buffer request includes an identification of at least one of an address range for memory reads or an address range for memory writes; and
set at least one of a read permission or a write permission associated with one or more corresponding physical address ranges in the physical address space, based on the DMA buffer request.

11. The one or more non-transitory computer-readable storage media of claim 8, wherein to create the memory isolation domains further comprises to:
enumerate one or more buses that provide DMA access to the memory; and allocate a range of physical addresses in the memory for each enumerated bus.

12. The one or more non-transitory computer-readable storage media of claim 11, wherein to enumerate one or more buses that provide DMA access to the memory comprises to enumerate at least one of a peripheral component interconnect (PCI) bus or a universal serial bus (USB).

13. A method for performing a secure firmware update, the method comprising:
   booting, in response to detection of a request to install a firmware update payload, a compute device in a firmware update boot mode;
   determining, by the compute device, whether the compute device is able to remap memory addresses from a device address space to a physical address space of a memory of the compute device;
   transmitting, in response to a determination that the compute device is able to remap the memory addresses, a request to create a memory isolation domain for each of one or more physical devices that have direct memory access to the memory of the compute device;
   creating, by the compute device, a memory isolation domain for each of the one or more physical devices, wherein each memory isolation domain comprises a device address space that is indirectly mapped to a physical address space in the memory that is mutually exclusive to the physical address spaces of the other memory isolation domains;
   analyzing, by the compute device, an identifier included in a firmware update payload stored in the memory that identifies one or more of the physical devices associated with the firmware update payload;
   disabling, by the compute device, access to the isolation domains of the physical devices that are not associated with the firmware update payload after the physical devices not associated with the firmware update payload have been identified; and
   moving, by the compute device, the firmware update payload to the memory isolation domains of each associated physical device to enable secure transmission of the firmware update payload to the associated physical devices.

14. The method of claim 13, further comprising:
   detecting, by the compute device, a memory access request transmitted from one of the physical devices, wherein the memory access request includes a first address within the device address space; and
   translating, by the compute device and in response to the detection of the memory access request, the first address to a second address within the physical address space of the isolation domain associated with the physical device that transmitted the memory access request.

15. The method of claim 13, wherein creating an isolation domain comprises:
   initializing, by the compute device, a controller driver associated with one of the physical devices;
   receiving, by the compute device, a DMA buffer request from the controller driver, wherein the DMA buffer request includes an identification of at least one of an address range for memory reads or an address range for memory writes; and
   setting, by the compute device, at least one of a read permission or a write permission associated with one or more corresponding physical address ranges in the physical address space, based on the DMA buffer request.

16. The method of claim 13, wherein creating the memory isolation domains further comprises:
   enumerating, by the compute device, one or more buses that provide DMA access to the memory; and
   allocating, by the compute device, a range of physical addresses in the memory for each enumerated bus.

17. The method of claim 16, wherein enumerating one or more buses that provide DMA access to the memory comprises enumerating at least one of a peripheral component interconnect (PCI) bus or a universal serial bus (USB).

* * * * *